United States Patent
Farges

[19]

[11] Patent Number: 6,125,405
[45] Date of Patent: *Sep. 26, 2000

[54] MEMORY CARD OR CHIP CARD READER SYSTEM

[75] Inventor: Michel Farges, Rousset, France

[73] Assignee: SGS-Thomson Microelectronics S.A., Gentilly, France

[*] Notice: This patent issued on a continued prosecution application filed under 37 CFR 1.53(d), and is subject to the twenty year patent term provisions of 35 U.S.C. 154(a)(2).

[21] Appl. No.: 08/507,941

[22] Filed: Jul. 27, 1995

[30] Foreign Application Priority Data

Jul. 28, 1994 [FR] France .................................. 94 09381

[51] Int. Cl.[7] .................................................. G06F 13/00
[52] U.S. Cl. ............................ 710/2; 710/129; 710/101; 710/102; 710/64; 235/375; 235/486
[58] Field of Search .................................. 395/822, 282, 395/285, 286, 309, 500, 828–832, 882–883, 892–894; 235/382, 380, 441, 492, 438, 375, 379, 444, 486; 710/101–102

[56] References Cited

U.S. PATENT DOCUMENTS

| | | | |
|---|---|---|---|
| 4,855,905 | 8/1989 | Estrada et al. ........................ | 710/129 |
| 5,034,598 | 7/1991 | Poland .................................. | 235/435 |
| 5,034,599 | 7/1991 | Hirata .................................... | 235/438 |
| 5,247,164 | 9/1993 | Takahashi ............................. | 235/492 |
| 5,297,200 | 3/1994 | Murray ................................... | 380/4 |
| 5,310,998 | 5/1994 | Okuno .................................... | 395/282 |
| 5,414,835 | 5/1995 | Iijima ...................................... | 395/550 |
| 5,457,784 | 10/1995 | Wells et al. ............................ | 710/9 |
| 5,484,993 | 1/1996 | Seto et al. .............................. | 235/437 |
| 5,486,687 | 1/1996 | Le Roux ................................. | 235/382 |
| 5,488,223 | 1/1996 | Austin et al. .......................... | 235/375 |
| 5,520,275 | 5/1996 | Foglino .................................. | 235/382 |
| 5,528,758 | 6/1996 | Yeh ...................................... | 395/200.08 |
| 5,541,985 | 7/1996 | Ishii et al. .............................. | 379/111 |
| 5,615,388 | 3/1997 | Yoshimatsu et al. ................. | 395/281 |
| 5,635,701 | 6/1997 | Gloton .................................... | 235/486 |
| 5,638,530 | 6/1997 | Pawate et al. ........................ | 395/442 |
| 5,659,800 | 8/1997 | Zhang et al. .......................... | 395/882 |
| 5,715,066 | 2/1998 | Kurita et al. .......................... | 358/296 |
| 5,727,230 | 3/1998 | Fujioka .................................. | 395/825 |
| 5,822,507 | 10/1998 | Uda et al. .............................. | 395/114 |
| 5,907,690 | 5/1999 | Heflin .................................... | 710/129 |

FOREIGN PATENT DOCUMENTS

| | | | |
|---|---|---|---|
| WO-A-90 12357 | 10/1990 | WIPO ......................... | G06F 1/00 |

*Primary Examiner*—Ayaz R. Sheikh
*Assistant Examiner*—Raymond N Phan
*Attorney, Agent, or Firm*—Wolf, Greenfield & Sacks, P.C.; James H. Morris; Theodore E. Galanthay

[57] ABSTRACT

A memory card or chip card reader system in which the reader is connected to a microcomputer by a connection link enabling the connection, in a branch, of another computer peripheral such as a printer. This link enables the transmission, to the reader, of at least one operation signal. Such a system makes it possible to provide for a reader that has no microprocessor and therefore has no processing function. Furthermore, the microprocessor can possess only one connector common to the reader and printer. Applications to microcomputer links and card readers.

50 Claims, 6 Drawing Sheets

MEMORY CARD OR CHIP CARD READER SYSTEM

BACKGROUND OF THE INVENTION

1. Field of the Invention

The invention relates to a memory card or chip card reader system and more particularly to a card reader that can be connected to a microcomputer. Such a reader can be applied to the reading of synchronous memory type cards, for example telephone cards, as well as to the reading of the bank card types known as chip cards.

2. Discussion of the Related Art

The many readers that are in existence have the common feature of operation achieved by a microprocessor of their own that manages the sampling of an input/output line of the card and the associated transmission protocol. Furthermore, the microprocessor of the reader also provides for the interfacing with the microcomputer. Each reader therefore has a microprocessor whose design is developed to a greater or lesser extent and has a considerable effect on the cost of the reader.

The cards accepted by each reader and the protocols of transmission to the microcomputer are fixed in the microprocessor of the reader. This microprocessor finds out whether it can process the card presented to it and, together with the microcomputer, decides on the transmission protocol.

The connection of a card reader to the microcomputer is done by means of a connector or port on the microcomputer that is reserved solely for the connection of the reader. This port may be designed for serial or parallel transmission. This therefore necessitates a specific port for the card reader on each microcomputer. This is a drawback because it is useful, for reasons of cost or flexibility of use, to reduce the number of ports in the microcomputer.

SUMMARY OF THE INVENTION

The invention relates to a memory card (or chip card) reader system comprising at least one microcomputer equipped with at least one input/output connector of the microcomputer as well as a card reader. This system comprises notably a connection link enabling the connection, in a branch, to the same input/output connector of the microcomputer, of the card reader as well as another peripheral device. This link enables the transmission, to the reader, of at least one signal to validate the operation of the reader, the reader having a circuit to identify this validation signal.

A design of a transmission architecture such as this has now become possible because of the development of microcomputers. The processing capacities are now sufficiently developed and, in particular, the processing speeds enable the microcomputer to take charge of the work done hitherto by the microprocessor of the reader.

For example, an 8086 type processor worked with 8 bits at a clock frequency of 4 to 5 MHz. The 286 type processor with the 16-bit registers works at a frequency of 16 MHz. At present, the 386 and 486 type processor work with 32-bit and 64-bit registers respectively and at speeds corresponding respectively to 33 MHz and 66 Mhz. Furthermore, certain new processors integrate architectural improvements such as ultra-fast memories known as cache memories that make it possible to reduce memory-call operations and increase the processing power of the processor.

Under these conditions, a microcomputer has become capable of taking charge of the work of managing the card reader. It will notably be capable of managing the transmission protocols to the reader. The result of this is that it will be easy to modify the protocols since it will be possible to modify them in the microcomputer.

According to an embodiment of the invention, the card reader does not have any microprocessor, the microcomputer being appropriately programmed to exchange information with the reader according to a protocol adapted to this reader.

According to this design, the microcomputer is fast enough to sample the input/output line of the card. The transmission speed is limited only by the speed of the microcomputer.

However, while the microcomputer can process an information element at each bit time without any difficulty, it is difficult for it to produce the necessary time base with sufficient precision. Consequently, for reception, the reader has the task of carrying out a high-precision sampling of the input/output line to keep the information available for the microcomputer software throughout the duration of a bit time. The transmission works according to a similar principle. The bits transmitted by the microcomputer software are resynchronized by the reader.

BRIEF DESCRIPTION OF THE DRAWINGS

The different objects and features of the invention shall appear more clearly in the following description and in the appended figures, of which.

DETAILED DESCRIPTION

An object of the invention is to make a card reader that can be connected to a parallel port of the microcomputer, generally used for the printer. The printer then shares the same port as the card reader. This does not complicate the connection equipment of the microcomputer. The invention provides a simplified reader, related to this connection mode, that is capable of working in cooperation with the microcomputer.

However, such a design comes up against the question of the compatibility of the reader with the microcomputer to which it is connected, as well with the peripherals (such as printers) connected to the microcomputer. Furthermore, a reader such as this, connected to the same port as another peripheral, should not disturb the working of this other peripheral nor be disturbed by this other peripheral.

A valuable application of the reader of the invention lies in the use of memory cards or chip cards as a software protection key. Indeed, the great variety of memory cards and chip cards and their flexibility of use make them products that are particularly well suited to checking access to software. The following are some examples of services that can easily be provided with a memory card (or a chip card) used in a reader according to the invention:

the management of the closing date of validity for a hired or demonstration software program;

the prepayment of time units for the effective use of the software program;

the validation of functions according to user, namely permitting a user to use determined functions of a software program under operation in the microcomputer;

the replacement of several keys for software by a single card.

Another characteristic of the reader according to the invention lies in its architecture. Indeed, this reader requires no microprocessor. The software of the microcomputer (PC) directly guides the reader. Consequently, the products and protocols accepted depend solely on the software of the microcomputer.

This organization gives rise to another appreciable advantage that lies in the open-ended nature of the system and its flexibility of use and adaptation. For example, the updating of the software of the microcomputer is done by the loading of diskettes whereas, in known readers, a change in product or protocol dictates a change in the program memory of the microprocessor of the reader. Certain readers can be remote-loaded but are costly and hardly applicable for current applications.

Figure 1A:
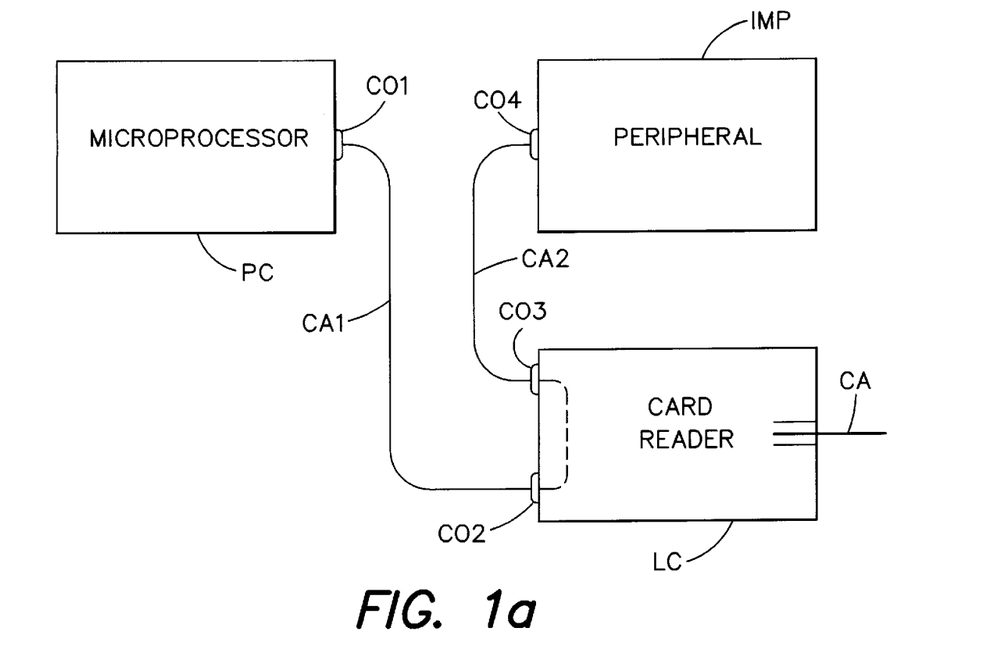
FIGS. 1a and 1b show simplified exemplary embodiments of the system of the invention.
Figure 1B:
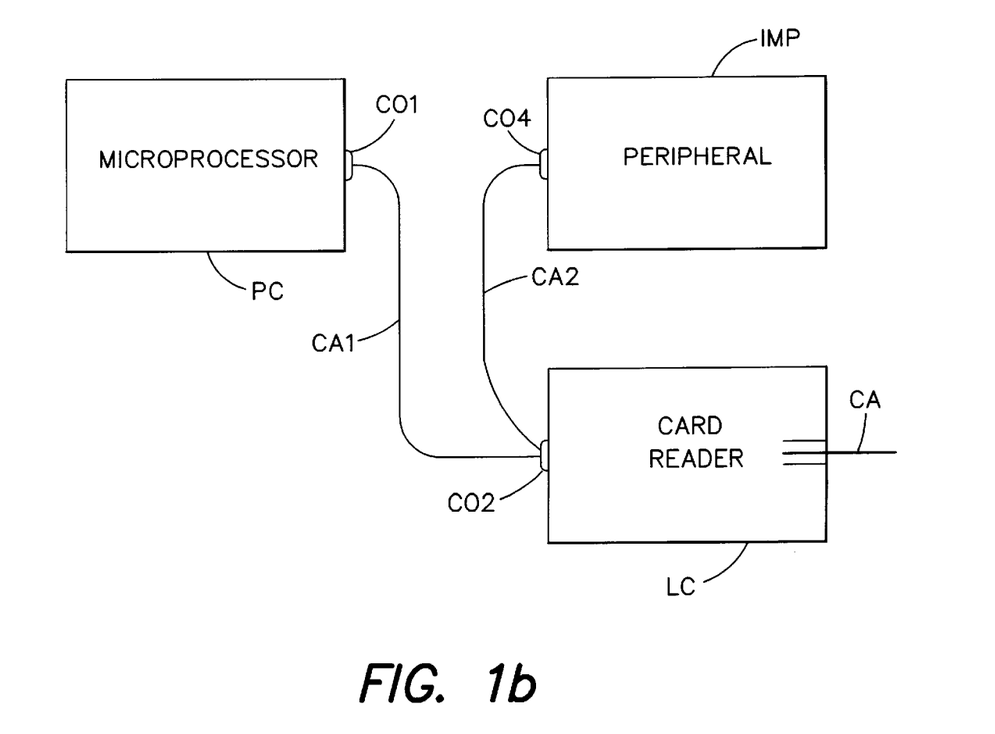

Referring to FIGS. 1a and 1b, a description shall be given first of all of a general exemplary embodiment of the system according to the invention.

These figure show a microcomputer referenced PC (such as a personal computer), a card reader LC and another computer peripheral such as a printer IMP.

The card reader LC may be capable of reading cards CA of the memory card or chip card type. According to the invention, these cards may belong to a variety of models and brands.

In particular, according to the invention, the microcomputer PC has only one connector or port CO1 for both the connection with the card reader LC and connection with the printer IMP.

According to FIG. 1a, the card reader has a port CO2 for the connection of the reader to the port CO1 of the microcomputer by means of the cable CA1 and a port CO3 for the connection of the reader to the port CO4 of the printer by means of the cable CA2. The ports CO2 and CO3 are interconnected in the reader.

According to FIG. 1b, the port CO2 of the reader is connected to the port CO1 of the microcomputer but the cable CA2 is connected in a branch connection to the cable CA1 in such a way that the reader has only one port CO2 to which the port CO4 of the printer IMP can be connected.

Figure 2:
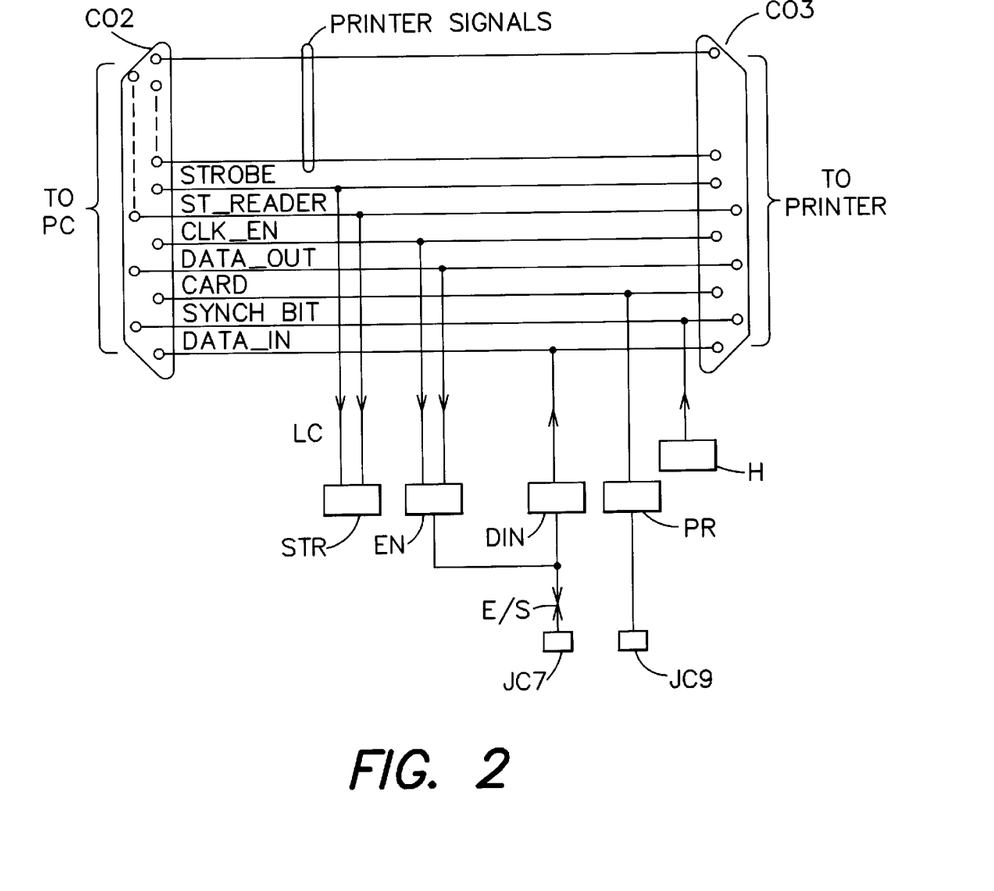
FIG. 2 shows a simplified exemplary embodiment of the reader according to the invention.
Figure 4A:
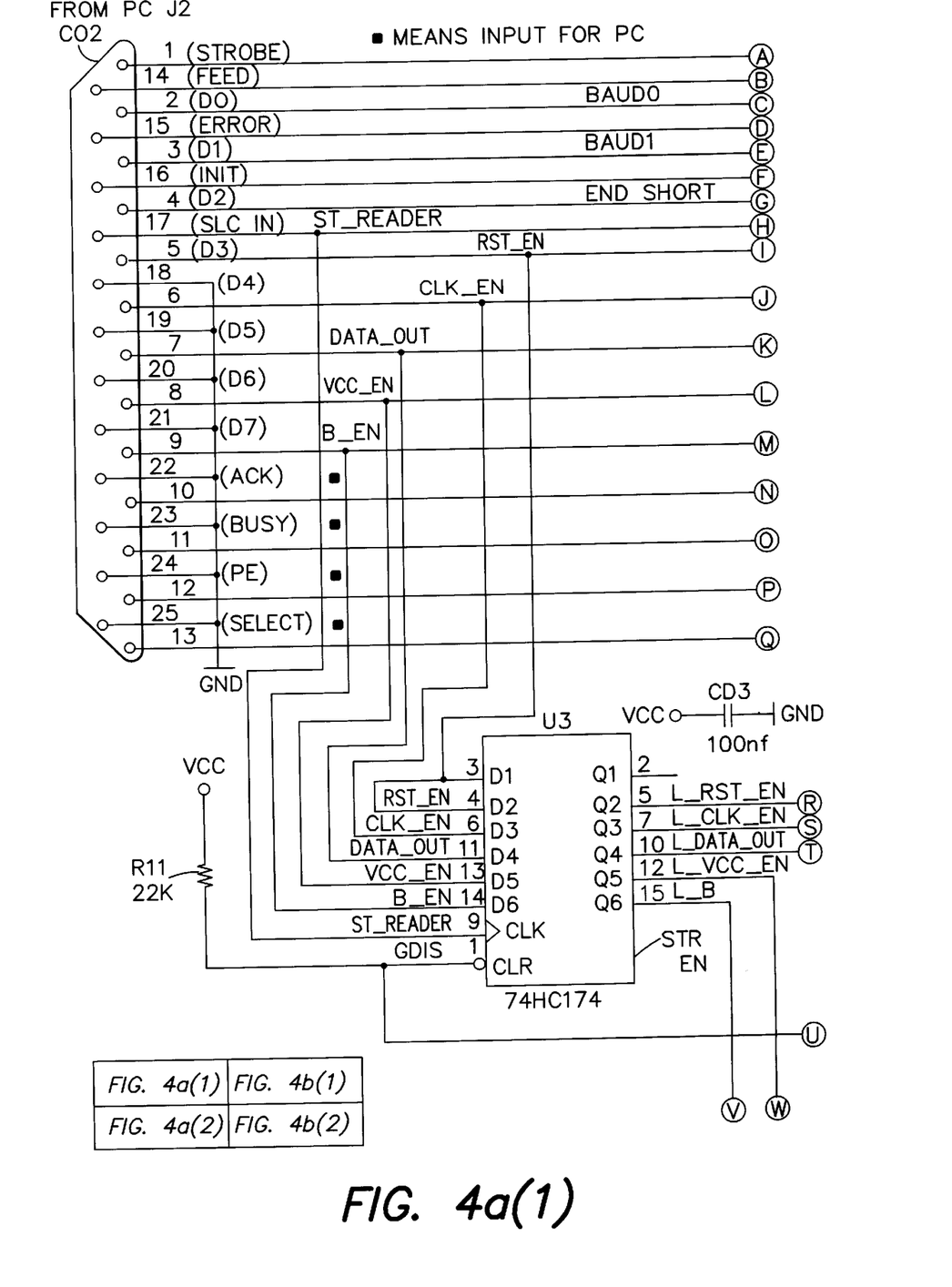
FIGS. 4a to 4b show a detailed exemplary embodiment of the reader according to the invention.
Figure 4B:
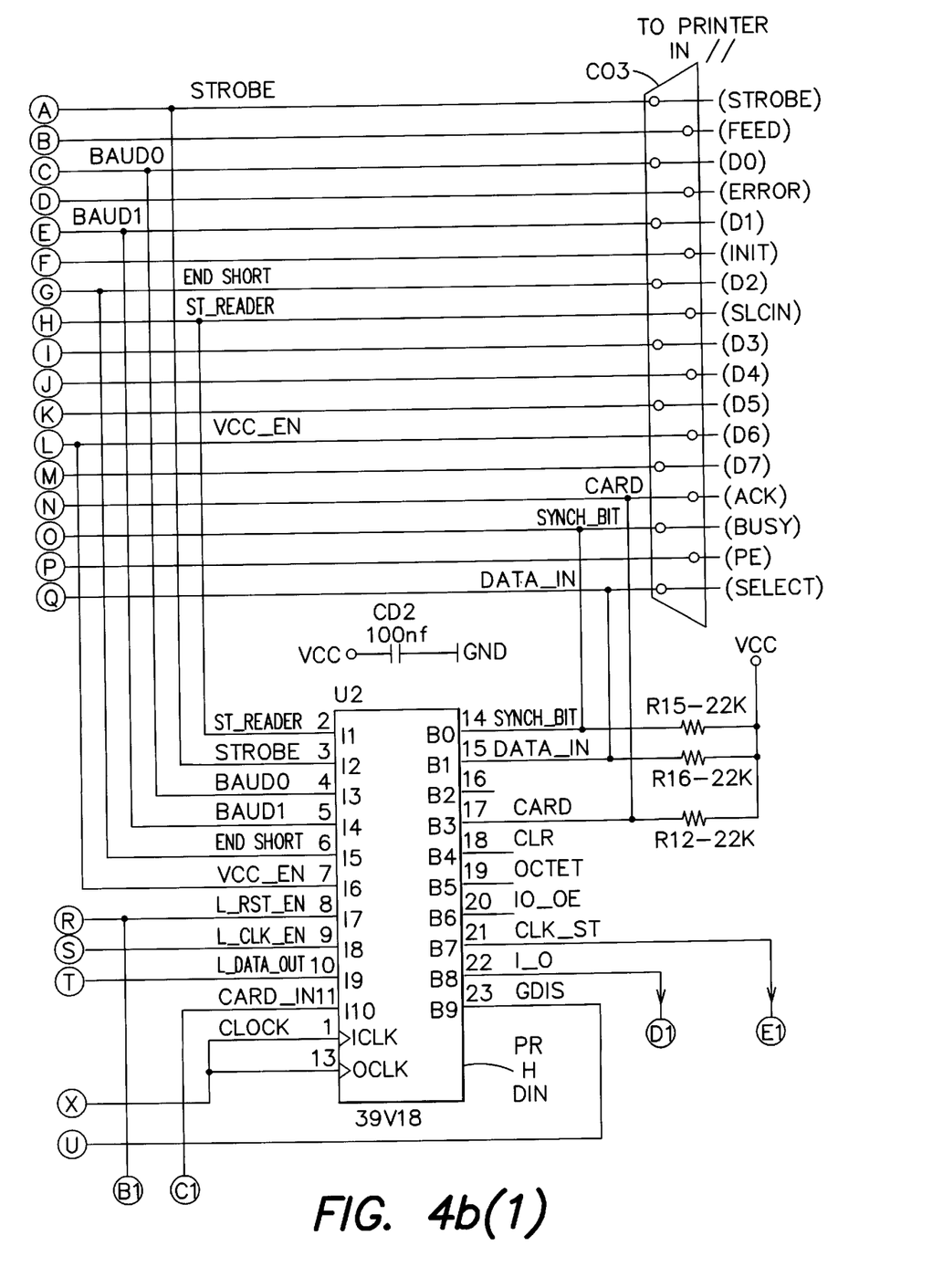

FIG. 2 shows an exemplary simplified embodiment of the reader of the invention indicating the wires and signals needed for communications between the microcomputer and the card reader. FIGS. 4a and 4b show a detailed practical embodiment with, notably, the standardized meanings of the signals attached to a standardized parallel type connector.

The upper part of this FIG. 2 shows the ports CO2 and CO3 enabling the connection of the reader respectively to the microcomputer PC and to a peripheral such as the printer IMP.

Connection devices such as JC7 and JC9 enable the connection of a card to the reader. Should there be a card in the reader, a circuit PR detects the presence of this card and gives a presence signal on the wire CARD to the microcomputer PC.

The reader LC has a circuit STR enabling the identification of a signal received from the microcomputer and informing it that it will exchange information elements with the microcomputer.

The microcomputer provides a signal on a wire called ST READER. This signal is identified by the circuit STR. If necessary, the circuit STR verifies the absence of a signal on a wire called STROBE. Indeed, a signal STROBE enables the starting of a call from the microcomputer PC to the printer IMP. The reader LC is then activated in reception mode.

In the case of the transmission of information elements from the microcomputer PC to the reader LC, the microcomputer PC sends information elements on a wire called DATA OUT.

After the start of each information bit, a clock circuit H gives, on a wire called SYNCH BIT, a clock signal whose leading edge is located after the leading edge of the bit, for example in the middle of each bit. This signal SYNCH BIT is used by the microcomputer to sample or bring about the sampling of the bits received on the E/S or DATA OUT wires.

For each transmitted bit, the reader LC, by means of a recording circuit EN, samples the information bit DATA OUT with the validation signal CLK EN. This enables the reader to take the value of each bit (typically by storing it in a register) by getting rid of the effect of parasites and untimely modulations that may affect the start (leading edge) of each bit. The circuit EN then retransmits, as the case may be, the information elements on the connection JC7 to the card. The circuit EN has, for example, a monostable circuit that produces a calibrated delay. This monostable circuit preferably has a counter to count the delay period. The circuit EN and the circuit STR are preferably formed by means of a 74HC174 type circuit.

In the case of the transmission of information in the direction going from the reader l,C to the microcomputer PC, a circuit DIN that has received information elements from the card by the connection E/S connected to the terminal JC7 presents them on the wire DATA IN. The circuit PR, the circuit H and the circuit DIN are preferably set up by means of a 39V18 type integrated circuit.

Figure 3:
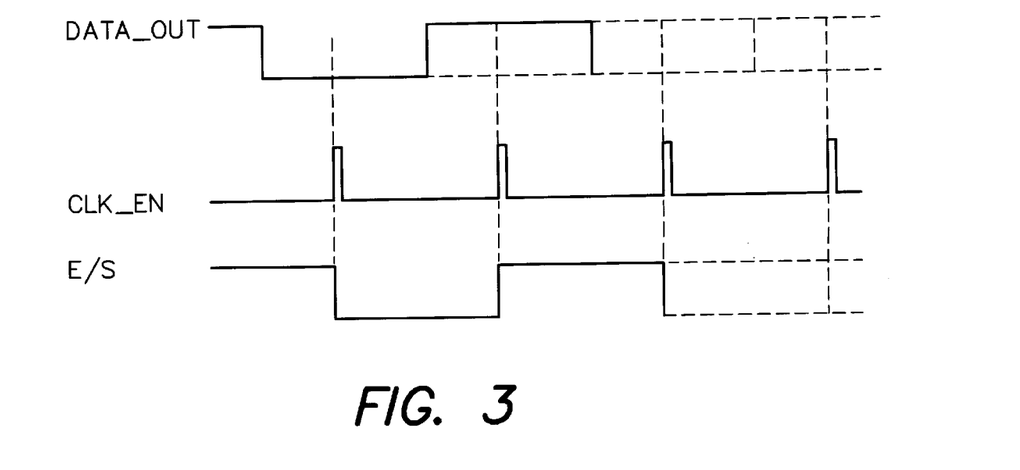
FIG. 3 represent data signals and their transmitted sampling signals.

FIG. 3 shows an example of transmitted bits DATA OUT. This figure shows, offset with respect to the leading edges of the bits, the validation signal CLK EN and the corresponding data element transmitted to the card by the connection E/S.

The card reader thus described may be implemented without any microprocessor, unlike existing card readers. The card reader therefore no longer requires any smart functions. The functions such as those of protocol conversion, for example the conversion of byte-oriented protocols into byte group oriented protocols may be done in the microcomputer PC. Similarly the adaptation to the type of card may be done in the microcomputer.

The card reader system is therefore simplified as regards the reader but gives flexibility of use by transferring the possibilities of the modification of the operation to the microcomputer.

Furthermore, the system of the invention provides for security of transmission even though the reader no longer has any operational autonomy.

FIGS. 4a and 4b show a detailed exemplary embodiment of a card reader.

FIGS. 4a and 4b are placed together in a state of graphic correspondence.

These figures again show the ports CO2 (to the microcomputer) and CO3 (to the printer).

At the bottom of these figures is the port CO5 for the connection of a card. The figure also shows certain wires described with reference to FIG. 2.

The different connection wires bear the names of the signals that they convey. The signals have the following functions:

STROBE=signal for the validation of data to the printer;
FEED=page feed signal to printer;
BAUD 0,
BAUD 1=signals for the printer or initialization of the reader;
ERROR=error signal for the printer;
END SHORT=the signal END indicates the end of a byte and the signal SHORT indicates an operation in synchronous mode or a printer data element;
ST READER=operation validation signal intended for the reader or a printer data element;
RST_EN=signal to reinitialize or reset the card or a printer data element;
CLK_EN=signal to validate the clock of the card or a printer data element;
DATA_OUT=data signals sent out by the microcomputer to the reader;
VCC_EN=signal to validate the electrical supply of the card or a printer data element;
CARD (or ACK)=signal indicating the presence of a card in the card reader; or acknowledgment sent out by the printer;
SYNCH_BIT=validation clock signal sent out by the reader to the microcomputer or indication that the printer is busy;
DATA IN=signal representing information elements sent by the reader to the microcomputer, or indications that the printer is connected.

With respect to the port CO5 for the connection of a card, the different connections, which are duplicated to meet different connection standards, have the following functions:
JC5/JC15=supply of a ground GND;
JC4/JC14=transmission of the control signal known as B for a memory card or chip card;
JC9/JC10=the presence of a card has the effect of prompting the opening of the contacts normally closed at rest and connecting the two connections JC9 and JC10. The opening of this contact indicates the presence of a card;
JC7/JC17=transmission of I/O information in both directions of transmission;
JC3/JC13=clock signal for the validation of transmitted data bits.

Since the microcomputer connector used is preferably of the parallel connector type, it will be noted that in the invention the useful data are exchanged according to a series protocol with the wires DATA OUT and DATA IN.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only, and not intended to be limiting. The invention is limited only as defined in the following claims and the equivalents thereto.

What is claimed is:

1. A card reader system, comprising:
at least one microcomputer having a parallel type input/output connector;
a card reader having a circuit for identification of a first validation signal to validate an operation of the card reader;
the card reader including a connection link that enables a branch connection to the parallel type input/output connector and to a peripheral device to allow communication between the microcomputer and the peripheral device, the connection link enabling a transmission to the card reader of the first validation signal, wherein the connection link of the card reader includes a first connector for connecting to the microcomputer and a second connector for connecting to the peripheral device, wherein the first connector and the second connector are interconnected in the card reader.

2. The card reader system of claim 1, wherein the microcomputer is programmed to exchange information with the card reader according to a protocol of the card reader.

3. The card reader system of claim 1, wherein the card reader transmits a second validation signal after a start of a transmission of each information bit to the card reader.

4. The card reader system of claim 1, wherein the card reader further includes a circuit for preparation, after a start of transmission of each information bit to the computer, of a second validation signal, wherein the microcomputer detects the second validation signal and takes account of a value of each information bit at a time when the microcomputer detects the second validation signal.

5. The card reader system of claim 1, wherein:
a card is installed in the card reader; and
the at least one microcomputer includes means for writing data to the card via the card reader.

6. The card reader system of claim 1, wherein the card reader is coupled to the microcomputer by an external cable.

7. The card reader system of claim 1, wherein:
the card reader includes a clock circuit having an output that provides a synchronization signal to the microcomputer; and
the microcomputer samples data from the card reader based upon a timing of the synchronization signal.

8. The card reader system of claim 1, wherein the card reader includes:
an identification circuit having an input that detects the first validation signal received from the microcomputer and in response sets the card reader to a reception mode; and
a presence detection circuit having an input that detects when a card is in the card reader and an output that provides a presence detection signal to the microcomputer when the card is in the card reader.

9. A card reader for communicating with an electronic card, the card reader being connected to a I/O port of the computer, the card reader comprising:
a detection circuit that detects whether the electronic card is in the card reader and provides a presence detection signal to the computer when the electronic card is in the card reader;
a data in circuit that receives input data from the electronic card and provides the input data to the computer;
a selection circuit, coupled to the detection circuit and the data in circuit, that receives selection signals from the computer to activate the card reader, wherein the selection circuit detects when the card reader is selected by the computer; and
a first connector for connecting the card reader to a peripheral device to enable communication between the peripheral device and the computer.

10. The card reader of claim 9, wherein the data in circuit includes:
a data buffer that receives the input data from the card, and provides the input data to the computer; and
a clock circuit that activates a clock signal when the input data has been provided to the computer by the data buffer.

11. The card reader of claim 9, wherein the card reader further includes a single I/O connector that couples together the I/O port of the computer, the card reader, and the peripheral device.

12. The card reader of claim 9, further comprising:
a first I/O connector that couples the card reader to the computer; and
a second I/O connector that couples the card reader to the peripheral device.

13. The card reader of claim 9, wherein the peripheral device is a printer.

14. The card reader of claim 9, wherein the I/O port of the computer is a parallel I/O port.

15. The card reader of claim 9, wherein processing on the card reader is controlled by the computer.

16. The card reader of claim 9, further comprising a data out circuit, that receives output data from the computer, and provides the output data to the electronic card.

17. The card reader of claim 9, further comprising includes a signal generator having an output that provides a synchronization signal to the computer, wherein the computer samples data from the card reader based upon a timing of the synchronization signal.

18. The card reader of claim 10, wherein the data buffer, the clock circuit, and the detection circuit are implemented in a 39V18 type integrated circuit.

19. The card reader of claim 12, wherein the first I/O connector and the second I/O connector are coupled together within the card reader.

20. The card reader of claim 15, wherein the processing on the card reader that is controlled by the computer includes interface protocol processing between the card reader and the electronic card.

21. A card reader for communicating with an electronic card, comprising:
means for connecting the card reader to a computer and to a peripheral device, including means for allowing the computer to communicate with the peripheral device wherein the means for connecting includes a first connector for connecting to the computer and a second connector for connecting to the peripheral device, wherein the first connector and the second connector are interconnected;
means for disabling the card reader when the computer selects the peripheral device and for enabling the card reader when the computer selects the card reader; and
means for receiving data from the computer and writing data to the electronic card.

22. The card reader of claim 21, further comprising:
means for receiving input data from the electronic card; and
means for providing the input data to the computer.

23. The card reader of claim 18, further comprising:
means for detecting that the electronic card is connected to the card reader; and
means for indicating to the computer that the electronic card is connected to the card reader.

24. The card reader of claim 23, wherein the means for detecting and the means for indicating operate even if the card reader is disabled by the means for disabling.

25. The card reader of claim 21, further comprising:
means for receiving protocol information from the computer; and
means for communicating with the electronic card according to the protocol information.

26. The card reader of claim 21, further comprising means for providing a synchronization signal to the computer, wherein the computer samples data from the card reader based upon a timing of the synchronization signal.

27. A method for operating a card reader that communicates with an electronic card, comprising the steps of:
connecting the card reader to an I/O port of a computer that includes the electronic card;
connecting the card reader to a peripheral device;
detecting when the computer selects the card reader;
disabling the card reader when the computer selects the peripheral device to allow the computer to communicate with the peripheral device via the card reader; and
enabling the card reader when the computer selects the card reader.

28. The method of claim 27, further comprising the steps of:
receiving input data from the electronic card; and
providing the input data to the computer.

29. The method of claim 27, further comprising the steps of:
detecting that the electronic card is connected to the card reader; and
indicating to the computer that the electronic card is connected to the card reader.

30. The method of claim 27, further comprising the steps of:
receiving protocol information from the computer; and
communicating with the electronic card according to the protocol information.

31. The method of claim 27, further comprising a step of providing a synchronization signal to the computer, wherein the computer samples data from the card reader based upon a timing of the synchronization signal.

32. The method of claim 29, wherein the steps of detecting and indicating are performed even if the card reader has been disabled.

33. An apparatus comprising:
a computer having a communications port;
a card reader coupled to the communications port of the computer, wherein the card reader includes a single I/O connector that couples together the communications port of the computer, the card reader, and the peripheral device; and
a peripheral device coupled to the card reader;
wherein the computer includes means for selecting one of the card reader and the peripheral device and for writing data from the computer to the card reader.

34. The apparatus of claim 33, wherein the card reader includes:
a first I/O connector that couples the card reader to the communications port of the computer; and
a second I/O connector that couples the card reader to the peripheral device.

35. The apparatus of claim 33, wherein the peripheral device is a printer.

36. The apparatus of claim 33, wherein the communications port of the computer is a parallel I/O port.

37. The apparatus of claim 33, wherein the card reader includes a signal generator having an output that provides a synchronization signal to the computer, wherein the computer samples data from the card reader based upon a timing of the synchronization signal.

38. The apparatus of claim 33, further comprising a signal generator having an output that provides a synchronization signal to the computer, wherein the computer samples data from the card reader based upon a timing of the synchronization signal.

39. The apparatus of claim 34, wherein the first I/O connector and the second I/O connector are coupled together within the card reader.

40. A card reader for communicating with an electronic card, the card reader being connectable to a I/O port of a computer, the card reader comprising:
- a detection circuit that detects whether the electronic card is in the card reader and provides a presence detection signal to the computer when the electronic card is in the card reader;
- a data in circuit that receives input data from the electronic card and provides the input data to the computer;
- means for receiving electronic card protocol information from the computer;
- means for connecting a peripheral device to the card reader; and
- means for connecting the computer to the card reader, wherein the means for connecting the peripheral device and the means for connecting the computer are coupled together at the card reader.

41. The card reader of claim 40, wherein the data in circuit includes:
- a data buffer that receives the input data from the card, and provides the input data to the computer; and
- a clock circuit that activates a clock signal when the input data has been provided to the computer by the data buffer.

42. The card reader of claim 40, further comprising a selection circuit, coupled to the detection circuit and the data in circuit, that receives selection signals from the computer to activate the card reader.

43. The card reader of claim 40, wherein the I/O port of the computer is a parallel I/O port.

44. The card reader of claim 40, wherein processing on the card reader is controlled by the computer.

45. The card reader of claim 41, wherein the data buffer, the clock circuit, and the detection circuit are implemented in a 39V18 type integrated circuit.

46. The card reader of claim 42, wherein the selection circuit detects when the card reader is selected by the computer.

47. The card reader of claim 42, wherein the means for connecting further includes a signal I/O connector that couples together with the I/O port of the computer, the card reader, and the peripheral device.

48. The card reader of claim 42, wherein the means for connecting further comprises:
- a first I/O connector that couples the card reader to the computer; and
- a second I/O connector that couples the card reader to the peripheral device.

49. The card reader of claim 48, wherein the first I/O connection and the second I/O connector are coupled together within the card reader.

50. The card reader of claim 42, wherein the peripheral device is a printer.

* * * * *